United States Patent Office 2,917,494
Patented Dec. 15, 1959

2,917,494
VINYL HALIDE SUSPENSION POLYMERIZATION PROCESS

Richard H. Martin, Jr., Springfield, Mass., assignor to Monsanto Chemical Company, St. Louis, Mo., a corporation of Delaware No Drawing. Application June 20, 1956
Serial No. 592,492

10 Claims. (Cl. 260—78.5)

This invention relates to a suspension polymerization process for the production of vinyl halide-containing polymers. More particularly, this invention relates to a suspension polymerization process in which certain novel suspending agents are employed.

In one of the customary preparations of vinyl halide-containing polymers, the monomers are polymerized in an aqueous medium containing a suspending agent to obtain the polymer in the form of small granules which are easily separated from the polymerization medium by filtration. Ideally, the granular polymers so obtained should be of a uniform small size and highly porous in nature so as to readily absorb plasticizers. The presence of large, non-porous glassy granules is undesirable, since such granules do not absorb plasticizer readily and this frequently leads to heterogeneity in the final product. Such heterogeneity is particularly noticeable when the vinyl halide-containing polymer is calendered into thin films.

Among the better suspending agents that have been proposed for the suspension polymerization of vinyl halide-containing polymers are the water-soluble interpolymers of maleic compounds such as the water-soluble interpolymers of maleic anhydride with vinyl acetate, vinyl methyl ether, ethylene, etc. While polymerization systems containing such suspending agents give high quality vinyl halide-containing polymers, it would be desirable to have improved polymerization systems which would give still smaller polymer particles and polymer particles of a more porous nature.

It is an object of this invention to provide an improved suspension polymerization process for the preparation of vinyl halide-containing polymers.

Another object of this invention is to provide an improved suspension polymerization process for the preparation of vinyl halide-containing polymers in which novel suspending agents are employed.

Other objects and advantages of this invention will become apparent from the following detailed description thereof.

It has been discovered that vinyl halide-containing polymers of fine particle size and good porosity can be prepared by polymerizing a vinyl halide monomer in an aqueous medium in the presence of a water-soluble interpolymer of a maleic compound as the primary suspending agent and a hydroxyl group-containing polymer as an auxiliary or secondary suspending agent. The hydroxyl group-containing polymers that are employed as auxiliary or secondary suspending agents contain 1.5–12.0 weight percent hydroxyl groups and are (1) interpolymers of a vinyl ester of a 1–10 carbon atom monocarboxylic acid and allyl alcohol or methallyl alcohol or (2) the analogous polymers obtained by reducing an interpolymer of a vinyl ester of a 1–10 carbon atom monocarboxylic acid and acrolein or methacrolein.

The following examples are set forth to illustrate more clearly the principle and practice of this invention to those skilled in the art. All parts are by weight.

EXAMPLE I

Part A

Vinyl chloride is polymerized in the polymerization system set forth below.

| Component: | Parts by weight |
|---|---|
| Water | 150 |
| Vinyl chloride | 100 |
| Maleic suspending agent | 0.1 |
| Auxiliary suspending agent | 0.17 |
| Lauroyl peroxide | 0.2 |

The above noted components are charged to a glass-lined reaction vessel that is swept free of oxygen and then sealed. The sealed reaction vessel is rotated end over end at 50° C. for twenty hours, at the end of which time the polymerization is complete. This reactor and polymerization technique are employed in the balance of the examples reported herein.

The recovered polymer is highly porous in nature and has a desirable small particle size with 53% of the product passing through a 100 mesh screen and substantially all of the balance passing through a 60 mesh screen.

The maleic suspending agent employed in this example is a partial tetrahydrofurfuryl ester of an ethylene-maleic anhydride interpolymer. This ester is prepared by reacting 5 parts of tetrahydrofurfuryl alcohol with 95 parts of an ethylene-maleic anhydride interpolymer in 100 parts of toluene. The ethylene-maleic anhydride interpolymer employed in the esterification reaction is prepared by interpolymerizing ethylene and maleic anhydride in benzene under superatmospheric pressure and the resulting interpolymer has a specific viscosity of 1.7 as determined in a 1% solution in dimethylformamide at 25° C. In the final product, 3.2 mol percent of the carboxyl groups of the ethylene-maleic anhydride interpolymer are esterified. The auxiliary suspending agent employed is in interpolymer of vinyl acetate and allyl alcohol containing approximately 8 weight percent hydroxyl groups.

Part B

Part A above is repeated except that the auxiliary suspending agent is deleted from the polymerization system. The product obtained is less porous than the product of Part A and of larger particle size as only about 40% of the polymer particles will pass through a 100 mesh screen.

Part C

Part A above is repeated except that the monomer charge consists of 95 parts vinyl chloride and 5 parts vinyl acetate. Comparable results are obtained.

EXAMPLE II

Vinyl chloride is polymerized for 20 hours at 50° C. in the polymerization system set forth below.

| Component: | Parts by weight |
|---|---|
| Water | 150 |
| Vinyl chloride | 100 |
| Maleic suspending agent | 0.3 |
| Auxiliary suspending agent | 1.2 |
| Lauroyl peroxide | 0.2 |

The polymer is highly porous and has a fine particle size with 82% of the product passing through a 100 mesh screen and the balance passing through a 60 mesh screen.

The maleic suspending agent employed in this example is an ethylene-maleic anhydride interpolymer that is prepared by interpolymerizing ethylene and maleic anhydride in benzene under superatmospheric pressure and has a specific viscosity of about 1.3 as determined in a 1% solution in dimethylformamide at 25° C. The auxiliary suspending agent employed is a vinyl acetate-allyl alcohol interpolymer containing 5.5 weight percent hydroxyl groups.

Part B

Part A above is repeated except that the auxiliary suspending agent is deleted from the polymerization system. The product obtained is less porous than the product of Part A and of larger particle size as only about 75% of the polymer particles will pass through a 100 mesh screen.

EXAMPLE III

Part A

A polyvinyl chloride polymer is prepared employing the polymerization system set forth below.

| Component: | Parts by weight |
|---|---|
| Water | 150 |
| Vinyl chloride | 100 |
| Maleic suspending agent | 0.3 |
| Auxiliary suspending agent | 0.15 |
| Lauroyl peroxide | 0.2 |

The product has a desirable small particle size with approximately 95% of the particles passing through a 100 mesh screen. The polymer is highly porous and readily absorbs plasticizer.

The maleic suspending agent employed in this example is an interpolymer of 50 mol percent vinyl acetate and 50 mol percent maleic anhydride. Approximately 4 mol percent of the maleic anhydride groups are esterified with 2 ethylhexanol. The auxiliary suspending agent employed is an interpolymer of vinyl acetate and allyl alcohol containing approximately 8 weight percent hydroxyl groups.

Part B

Part A above is repeated except that the auxiliary suspending agent is not included in the polymerization system. The polymer product that is obtained is less porous than the product of Part A and has a larger particle size as only about 70% of the polymer particles will pass through a 100 mesh screen.

Part C

Part A above is repeated except that the monomer mixture employed consists of 90 parts vinyl chloride and 10 parts vinyl acetate. Essentially comparable results are obtained.

EXAMPLE IV

Part A

Example III, Part A, is repeated except that the auxiliary suspending agent employed is an interpolymer of vinyl acetate and allyl alcohol containing 5.5 weight percent hydroxyl groups. The polymer obtained is highly porous in nature and 98% of the polymer particles will pass through a 100 mesh screen.

Part B

Part A above is repeated except that the monomer charge consists of 95 parts vinyl chloride and 5 parts diethyl maleate. Comparable results are obtained.

EXAMPLE V

Example III, Part A, is repeated except for two changes. First, the auxiliary suspending agent employed is an interpolymer of vinyl acetate and allyl alcohol containing 2.5 weight percent hydroxyl groups. Secondly, the concentration of the auxiliary suspending agent is increased to 0.6 part. The polymer that is obtained is highly porous in nature and 94% of the polymer particles will pass through a 100 mesh screen.

EXAMPLE VI

Example V is repeated except that the auxiliary suspending agent employed is an interpolymer of vinyl butyrate and allyl alcohol containing 4.5 weight percent hydroxyl groups. The polymer is highly porous in nature and 95% of the product passes through a 100 mesh screen.

EXAMPLE VII

To illustrate the wide latitude that may be employed in setting the ratio of the maleic suspending agent to the auxiliary suspending agent, several polymerizations are run employing the basic polymerization recipe and suspending agents set forth in Example III, Part A. The concentration of maleic suspending agent is set at two different levels and the quantity of auxiliary suspending agent employed is varied to give ratios of the primary maleic suspending agent to the auxiliary suspending agent varying from 10/1 to 0.8/1. The concentrations and ratios of suspending agents employed are shown in Table I together with the weight percent of the polymer passing through a 100 mesh screen.

TABLE I

| Run No. | Wt. Percent Maleic Suspending Agent | Wt. Percent Auxiliary Suspending Agent | Ratio, MSA/ASA [1] | Percent Polymer Through a 100 Mesh Screen |
|---|---|---|---|---|
| 1a | 0.09 | 0 | ---- | 50 |
| 1b | 0.09 | 0.009 | 10/1 | 58 |
| 1c | 0.09 | 0.022 | 4/1 | 68 |
| 1d | 0.09 | 0.045 | 2/1 | 73 |
| 1e | 0.09 | 0.075 | 1.2/1 | 73 |
| 1f | 0.09 | 0.111 | 0.8/1 | 67 |
| 2a | 0.2 | 0 | ---- | 72 |
| 2b | 0.2 | 0.07 | 3/1 | 87 |
| 2c | 0.2 | 0.10 | 2/1 | 87 |
| 2d | 0.2 | 0.13 | 1.5/1 | 93 |
| 3a | 0.3 | 0 | ---- | 72 |

[1] MSA/ASA = Maleic Suspending Agent/Auxiliary Suspending Agent.

It will be observed in the above table that in each polymerization the addition of the auxiliary suspending agent to the primary maleic suspending agent gives a product in which a larger percentage of the polymer will pass through a 100 mesh screen. In addition to smaller particle size, each of the polymers prepared in the presence of the auxiliary suspending agent is more porous and more readily absorbs plasticizer than the corresponding product prepared at the same concentration of primary maleic suspending agent, but in the absence of the auxiliary suspending agent. Runs 2a and 3a illustrate that a further reduction in polymer particle size cannot be obtained by increasing the concentration of the maleic suspending agent above 0.2%.

The primary suspending agents employed in the process of the present invention are water-soluble interpolymers of maleic compounds such as maleic acid, maleic anhydride and maleinimide. Typical examples of such water-soluble interpolymers include the interpolymers of maleic acid or maleic anhydride with vinyl methyl ether, vinyl acetate, ethylene, isobutylene, and such interpolymers that are partially esterified with 1–10 weight percent of saturated aliphatic alcohols such as butanol, hexanol, 2-ethylhexanol, tetrahydrofurfuryl alcohol, etc. Water-soluble maleic interpolymers of this type are known and their use in the suspension polymerization of vinyl halide-containing polymers is described in U.S. Patents 2,470,911 and 2,476,474 issued to Massimo Baer and in the copending applications of R. I. Longley and R. H. Martin, Jr., Serial No. 530,612, filed August 25, 1955, now U.S. Patent No. 2,823,200, and Serial No. 530,881, filed August 26, 1955, now U.S. Patent No. 2,824,862. Perhaps the most efficient of the maleic suspending agents in the practice of this invention are the interpolymers of vinyl acetate and maleic anhydride and particularly the partial esters of such interpolymers. Such water-soluble maleic interpolymers may be prepared by numerous well-known polymerization techniques.

The auxiliary or secondary suspending agents employed in the process of the present invention are interpolymers of a vinyl ester of a 1–10 carbon atom monocarboxylic acid and an unsaturated alcohol of the group consisting of allyl alcohol, methallyl alcohol and mixtures thereof. The proportion of the unsaturated alcohol contained in the interpolymer is such that the interpolymer contains 1.5–12.0 weight percent hydroxyl groups and more preferably 4.0–10.0 weight percent hydroxyl groups. The vinyl ester included in the auxiliary suspending agent may be the vinyl ester of virtually any 1–10 carbon atom monocarboxylic acid that is free of ethylenic and acetylenic unsaturation, but preferably is the vinyl ester of a saturated aliphatic monocarboxylic acid containing 1 to 4 carbon atoms, e.g., vinyl formate, vinyl acetate, vinyl propionate and vinyl butyrate. If desired, mixtures of 2 or more such vinyl esters may be included in the auxiliary suspending agents. Such interpolymers may be prepared by admixing the vinyl ester of the monocarboxylic acid and the unsaturated alcohol, either with or without a suitable solvent, and heating the mixture to 150–200° C. under autogenous pressure.

Fully equivalent auxiliary suspending agents can be prepared by an alternate procedure in which the vinyl ester of the 1–10 carbon atom monocarboxylic acid is interpolymerized with acrolein, methacrolein or mixtures thereof to prepare polymers containing carbonyl groups and subsequently reducing the carbonyl groups to hydroxyl groups, e.g., by hydrogenating the carbonyl group containing interpolymers. Such carbonyl group containing interploymers can be catalytically reduced over nickel catalysts at 150–200° C. under 2,000–5,000 pounds hydrogen pressure when the interpolymers are dissolved in suitable solvents, e.g., tetrahydrofurane. The preparation of the auxiliary suspending agents employed herein is more fully described in the copending application of Earl C. Chapin and Richard F. Smith, Serial No. 592,490, filed of even date herewith and that description is incorporated herein by reference.

Both the primary suspending agent and the auxiliary suspending agent are employed in small amounts. The primary water-soluble maleic interpolymer suspending agent is employed in the amount of 0.005–2.0 weight percent and more particularly 0.05–0.5 weight percent, such percentages being based upon the monomers. The hydroxyl group containing auxiliary suspending agent is ordinarily employed within these same concentration limits. As illustrated in Example VII, the ratio of the primary water-soluble maleic interploymer suspending agent to the hydroxyl group containing auxiliary suspending agent may be varied widely, but is usually adjusted so that the ratio of the maleic suspending agent to the auxiliary suspending agent falls within the limits of 10/1 to 0.2/1 and preferably 2/1 to 0.5/1.

Except for the suspending agents employed, the polymerizations of the present invention are carried out in the conventional manner. The ratio of water to monomers may vary from about 1:1 to about 9:1, but is ordinarily set in the range of about 1.5:1 to 2:1. The polymerization initiators employed are normally free radical generating initiators such as benzoyl peroxide, lauroyl peroxide, ditertiary butyl peroxide, toluyl peroxide and the like.

The process of the present invention is useful in the homopolymerization of vinyl fluoride, vinyl chloride, vinyl bromide and mixtures thereof and the interpolymerization of such vinyl halides with interpolymerizable essentially water-insoluble unsaturated compounds such as vinyl esters of carboxylic acids, e.g., vinyl acetate, vinyl propionate, vinyl butyrate, vinyl stearate, vinyl benzoate; esters of alpha, beta unsaturated monocarboxylic acids, e.g., methyl acrylate, ethyl acrylate, butyl acrylate, allyl acrylate, and the corresponding esters of methacrylic acid; amides such as acrylamide, acrylanilide, methacrylamide, etc.; nitriles, e.g., acrylonitrile, methacrylonitrile; vinylidene chloride; trichloroethylene; esters of alpha, beta unsaturated polycarboxylic acids, e.g., the methyl, ethyl, propyl, butyl, amyl, hexyl, heptyl, octyl, allyl and methallyl esters of maleic, itaconic, and fumaric acids and the like. Preferably, in the case of interpolymerizations, more than 50% by weight of the mixture of monomers is a vinyl halide, and especially vinyl chloride.

The above descriptions and particularly the examples are set forth by way of illustration only. Many other modifications and variations thereof will be obvious to those skilled in the art and can be made without departing from the spirit and scope of the invention herein described.

What is claimed is:

1. In a process for the suspension of polymerization of a vinyl halide of the group consisting of vinyl fluoride, vinyl chloride and vinyl bromide in which the vinyl halide is suspended and polymerized in water containing a water-soluble interpolymer of a maleic compound of the group consisting of maleic anhydride, maleic acid and maleinimide and an interpolymerizable vinylidene monomer as a suspending agent for the vinyl halide polymer; the improvement which comprises incorporating in the polymerization system 0.005–2.0 weight percent, based upon the monomers, of a hydroxyl group containing interpolymer as an auxiliary suspending agent, said hydroxyl group containing interpolymer containing 1.5–12.0 weight percent hydroxyl groups and being selected from the group consisting of (1) interpolymers of an unsaturated alcohol of the group consisting of allyl alcohol, methallyl alcohol and mixtures thereof and a vinyl ester of a 1–10 carbon atom monocarboxylic acid that is free of ethylenic and acetylenic unsaturation and (2) reduced interpolymers of an unsaturated carbonyl compound of the group consisting of acrolein, methacrolein and mixtures thereof and a vinyl ester of a 1–10 carbon atom monocarboxylic acid that is free of ethylenic and acetylenic unsaturation.

2. The process of claim 1 in which the vinyl halide polymerized is vinyl chloride.

3. The process of claim 2 in which the hydroxyl group containing interpolymer employed as the auxiliary suspending agent is an interpolymer of vinyl acetate and allyl alcohol.

4. The process of claim 2 in which the hydroxyl group containing interpolymer employed as the auxiliary suspending agent is an interpolymer of vinyl butyrate and allyl alcohol.

5. The process of claim 3 in which the water-soluble interpolymer of the maleic compound employed as the suspending agent is selected from the group consisting of vinyl acetate-maleic anhydride interpolymers, ethylene-maleic anhydride interpolymers and esters of such interpolymers that are esterified with 1–10 weight percent of a saturated aliphatic alcohol.

6. The process of claim 5 in which the water-soluble interpolymer of the maleic compound and the hydroxyl group containing interpolymer are each present in the amount of 0.005–2.0 weight percent of the monomers.

7. The process of claim 6 wherein at least 50 weight percent of vinyl chloride is interpolymerized with less than 50 weight percent of a vinyl ester of a monocarboxylic acid.

8. The process of claim 6 wherein at least 50 weight percent of vinyl chloride is interpolymerized with less than 50 weight percent of an alkyl ester of an alpha, beta unsaturated dicarboxylic acid; the alkyl group of said alkly ester of an alpha, beta unsaturated dicarboxylic acid containing 1–8 carbon atoms.

9. The process of claim 7 in which the vinyl ester of a monocarboxylic acid employed is vinyl acetate.

10. The process of claim 8 in which the alkyl ester of the alpha, beta unsaturated dicarboxylic acid employed is diethyl maleate.

References Cited in the file of this patent

UNITED STATES PATENTS

| | | |
|---|---|---|
| 2,227,163 | Starck et al. | Dec. 31, 1940 |
| 2,300,566 | Hahn et al. | Nov. 3, 1942 |
| 2,470,911 | Baer | May 24, 1949 |
| 2,483,960 | Baer | Oct. 4, 1949 |
| 2,705,226 | Bond | Mar. 29, 1955 |